(12) United States Patent
Hittle et al.

(10) Patent No.: US 10,865,705 B1
(45) Date of Patent: Dec. 15, 2020

(54) CONTROL VALVE ASSEMBLY

(71) Applicant: Caterpillar Inc., Peoria, IL (US)

(72) Inventors: Craig Hittle, Dunlap, IL (US); Eric Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/551,225

(22) Filed: Aug. 26, 2019

(51) Int. Cl.
*F02B 37/14* (2006.01)
*F02D 41/00* (2006.01)
*F02B 37/12* (2006.01)

(52) U.S. Cl.
CPC .............. *F02B 37/14* (2013.01); *F02B 37/12* (2013.01); *F02D 41/0007* (2013.01); *F02B 2037/122* (2013.01)

(58) Field of Classification Search
CPC .... F02B 37/14; F02B 37/12; F02B 2037/122; F02D 41/0007
See application file for complete search history.

(56) References Cited

U.S. PATENT DOCUMENTS 5,113,658 A * 5/1992 Kobayashi .............. F02B 37/10
60/608

* cited by examiner

*Primary Examiner* — Brandon D Lee
(74) *Attorney, Agent, or Firm* — Procopio, Cory, Hargreaves & Savitch LLP (57) ABSTRACT

A control valve assembly for an engine system having a turbocharger system. The control valve is configured to control the position of a turbine actuator and a compressor actuator by directing hydraulic fluid into the proper passages. The control valve assembly includes a hydraulic powered bypass valve that, when energized, can reduce flow restriction of the hydraulic fluid, and can increase the speed of actuation of the turbine actuator.

18 Claims, 5 Drawing Sheets

CONTROL VALVE ASSEMBLY

TECHNICAL FIELD

The present disclosure generally pertains to controlling turbocharger valves. More particularly this disclosure is directed towards a control valve assembly for a turbocharger.

BACKGROUND

An internal combustion engine may use a turbocharger to increase density of air and consequently the amount of air that enters the engine. The increased amount of air enables more fuel to be injected into the engine, thereby increasing engine power. A turbocharger generally includes a turbine, an air compressor, and a common shaft that connects the turbine to the air compressor. The turbine is driven by exhaust air that flows from an exhaust manifold. The air compressor is driven by the turbine to compress the air that enters an intake manifold.

U.S. Pat. No. 5,113,658 to Kobayashi describes an improved hydraulic assist turbocharger system for supplying charge air to a combustion engine. The system includes at least one turbocharger having a hydraulic assist turbine adapted to be driven by a pressurized hydraulic fluid to supplementally drive the turbocharger during selected engine operating conditions when supplemental charge air flow is required. Hydraulic fluid flow is regulated by an electrohydraulic control valve responsive to control signals from a main controller, wherein the control signals and corresponding control valve operation may be independent of engine speed and load. In addition, the hydraulic fluid is supplied to the hydraulic assist turbine via a dual segment nozzle, with appropriate selector valves coupling the fluid for passage through one or both nozzle segments in accordance with engine charge air requirements. The entire system, inclusive of the turbocharger and related control components, is conveniently provided as a unitary package adapted for facilitated mounting onto a combustion engine.

The present disclosure is directed toward overcoming one or more of the problems discovered by the inventors or that are known in the art.

SUMMARY

A control valve assembly for an engine system having a turbine with a turbine valve, an engine control module, a hydraulic fluid reservoir, and hydraulic fluid, is disclosed herein. The control valve assembly includes a hydraulic fluid supply inlet and a hydraulic fluid supply inlet passage in fluid communication with the hydraulic fluid supply inlet. The control valve assembly includes a control valve passage in fluid communication with the hydraulic fluid supply inlet passage and a control valve partially positioned within the control valve passage. The control valve assembly includes a turbine closed passage in fluid communication with the control valve passage, a compressor closed inlet in fluid communication with the turbine closed passage, and a compressor closed outlet. The control valve assembly includes a first hydraulic fluid drain passage in fluid communication with the compressor closed outlet and a hydraulic fluid drain outlet in fluid communication with the first hydraulic fluid drain passage. The control valve assembly includes a second hydraulic fluid drain passage extending from the first hydraulic fluid drain passage to the turbine closed passage. The control valve assembly includes a turbine open passage in fluid communication with the control valve passage, and a bypass passage in fluid communication with the turbine open passage. The bypass passage extends from the turbine open passage towards the second hydraulic fluid drain passage. The control valve assembly includes a bypass valve located between the bypass passage and the second hydraulic fluid drain passage.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
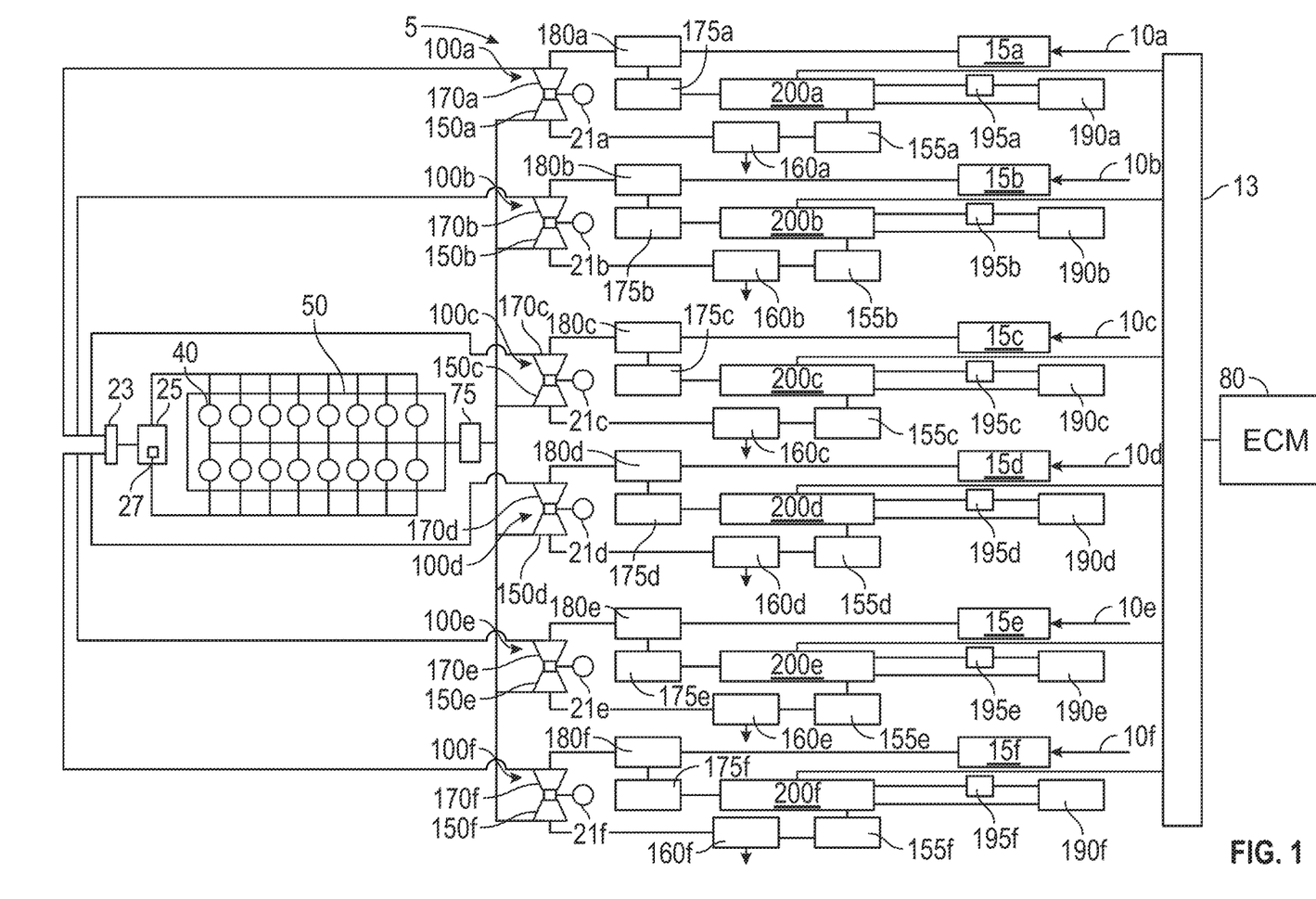
FIG. 1 is a functional block diagram of an exemplary engine system including multiple turbochargers and an engine control module.

FIG. 1 is a functional block diagram of an exemplary engine system including multiple turbochargers and an engine control module.

An engine system 5, for example for an engine for marine applications, includes an engine 50, turbocharger systems 100a-100f (also referred to as turbos), and an engine control module (ECM) 80. The ECM 80 can be operable to send out turbo valve commands. In an embodiment the engine system 5 includes six turbocharger systems 100a-f. Although six turbocharger systems 100a-f are shown in FIG. 1, the engine system 5 can include various numbers of turbocharger systems 100 such as two, three, four, five, six, seven, eight, nine, or more turbocharger systems 100. Each turbocharger system 100a can include a turbine 150a and a compressor 170a. The disclosure may generally reference an upstream and downstream direction, where reference to "upstream" and "downstream" are associated with the flow direction of air 10, also referred to as gas, passing through the engine system 5 and exiting as exhaust. For example, the engine 50 is downstream of the compressors 170a-f and the engine 50 is upstream of the turbines 150a-f.

The turbocharger systems 100a-f and their sub-components can be referenced sequentially herein using ordinal numbers to facilitate association and description. For example, the first turbocharger system 100a includes the first turbine 150a and the first compressor 170a. In further example the turbocharger system 100b can be referenced as the second turbocharger system 100b and the turbocharger system 100c can be referenced as the third turbocharger system 110c, and so on. In the following description, description directed to a reference number without a sub-letter, applies to each such element or component.

The engine system 5 can further include a plurality of air filters 15*a-f*. In one example, each turbocharger system 100 has an associated air filter 15. The air filter 15 filters air 10 entering into the engine system 5. In an example one air filter 15 filters air 10 for multiple turbocharger systems 100.

As shown in FIG. 1, each of the turbines 150*a-f* includes a turbine actuator 155*a-f* and a turbine valve 160*a-f*. However, in various examples one or more of the turbines 150*a-f* do not include a turbine actuator 155 or a turbine valve 160. In an embodiment the turbine valve 160 is a butterfly valve and the turbine actuator 155 is an on/off actuator.

Each of the compressors 170*a-f* can include a compressor actuator 175*a-f* and a compressor valve 180*a-f*. However, in various examples one or more of the compressors 170*a-f* do not include a compressor actuator 175 and a compressor valve 180. In an embodiment the compressor valve 180 is a flapper valve and the compressor actuator 175 is a one-way actuator for closing the compressor valve 180.

Air 10, also referred to as intake air, enters the engine system 5 for combustion, and enters through the air filter 15. The air 10 goes through the compressor valve 180 and into the compressor 170.

The air 10 leaves the compressor 170 and passes through an air cooler 23. The air cooler 23 can comprise separate circuit after cooling (SCAC), charge air cooling (CAC), and other suitable cooling methods and systems. The air 10 is cooled by the air cooler 23 and enters the intake manifold 25. The intake manifold 25 can be a suitable conduit or conduits through which air 10 flows to enter the engine 50.

A manifold absolute pressure (MAP) sensor 27 is positioned to measure the pressure of the air 10 passing through the intake manifold 25. The air 10 is distributed from the intake manifold 25 to a plurality of cylinders 40 located within the engine 50. The plurality of cylinders 40 can include sixteen cylinders 40 (Shown in FIG. 1). The plurality of cylinders 40 can include two, three, four, five, six, seven, eight, nine, ten, eleven, twelve, thirteen, fourteen, fifteen, sixteen, seventeen, eighteen, nineteen, twenty, or more cylinders 40.

The air 10 is mixed with fuel and the mixture is combusted to move the cylinders 40. The exhaust created from the combustion is collected by an exhaust manifold 75. The exhaust manifold 75 may be any suitable conduit through which gases flow from. The exhaust manifold 75 distributes the exhaust to the turbocharger systems 100.

The turbocharger systems 100 can be positioned as inline turbocharger systems 100 and can receive exhaust, for example inboard exhaust from an engine for marine applications. The turbocharger systems 100 can include control valve assemblies 200*a-f*. Components of the turbocharger systems 100 can be actuated via the turbine actuators 155 and compressor actuators 175, based on the control valve assemblies 200 operating in response to turbo valve commands from the ECM 80. The control valve assemblies 200 can comprise, for example, a two position, four way electro hydraulic control valve. In an embodiment the engine system 5 include a hydraulic fluid reservoir 190 and a pump 195. Each of the control valve assemblies 200 can be in fluid communication with a hydraulic fluid reservoir 190 (shown separate from the engine for ease of reference) such as a crankcase that can supply hydraulic fluid, such as oil, to the control valve assembly 200 and receive hydraulic fluid from the control valve assembly 200. The hydraulic fluid may be pressurized by the pump 195 before entering the control valve assembly 200.

The control valve assemblies 200 can control the turbine actuators 155 to actuate the turbine valves 160 of the turbine 150 to open and closed positions based on turbo valve commands received from the ECM 80. If the turbine valve 160 of a turbine 150 is positioned open, then the turbine 150 is engaged, also referred to as the turbocharger system 100 being engaged, "ON", or "added". If the turbine valve 160 of a turbine 150 is positioned closed, then the turbine 150 is disengaged, also referred to as the turbocharger system 100 being disengaged, "OFF", or "dropped".

The control valve assemblies 200 can control the compressor actuators 175 to actuate the compressor valves 180 closed in response to turbo valve commands from the ECM 80. A wire harness 13 can be used to provide an electrical communication medium between the ECM 80 and the control valve assemblies 200. The compressor valve 180 can be opened if the turbine valve 160 is open. The control valve assembly 200 that closed the compressor valve 180 can be in a deactivated position prior to being opened. The compressor valve 180 can be configured to be opened based on vacuum pressure generated downstream from the compressor valve 180. A mechanical device (not shown) can provided additional resistance to the compressor valve 180, such that the compressor valve 180 opens after a preset vacuum pressure is reached. For example, if the turbine valve 160 is positioned open, the compressor valve 180 can be opened by the vacuum pressure generated by the compressor 170 due to the spool up from the turbine 150. The compressor valve 180 can have an overcenter spring that holds the compressor valve open after the compressor valve 180 has been opened to prevent the compressor valve 180 from toggling between open and closed positions. If the turbine valve 160 is closed, the compressor valve 180 may not be opened, even if the preset vacuum pressure is reached.

The control valve assemblies 200 can control the turbine valve 160 and compressor valve 180 together. For example, the control valve assemblies 200 can control the turbine actuator 155 to close a turbine valve 160 while controlling the compressor actuator 175 to actuate the respective compressor valve 180 closed.

In an embodiment, at least one of the turbocharger systems 100 is a fixed turbocharger that is always "ON" or in use during operation of the engine system 5. For example, two, three or more turbocharger systems 100 are fixed turbochargers. In addition, the fixed turbocharges may not include a turbine actuator 155 and turbine valve 160 or a compressor actuator 175 and compressor valve 180. Further, the fixed turbocharges may not include control valve assemblies 200.

The turbocharger system 100 can include a turbo speed sensor 21 that measures the speed of a turbocharger system 100. For example, one, two, three or more of the turbocharger systems 100 include the turbo speed sensor 21. In some embodiments with fixed turbochargers, the fixed turbochargers can each include the turbo speed sensor 21 while the turbocharger systems 100 that are not fixed, do not include turbo speed sensors 21. In an embodiment, all of the turbocharger systems 100 each include a turbo speed sensor 21.

Figure 2:
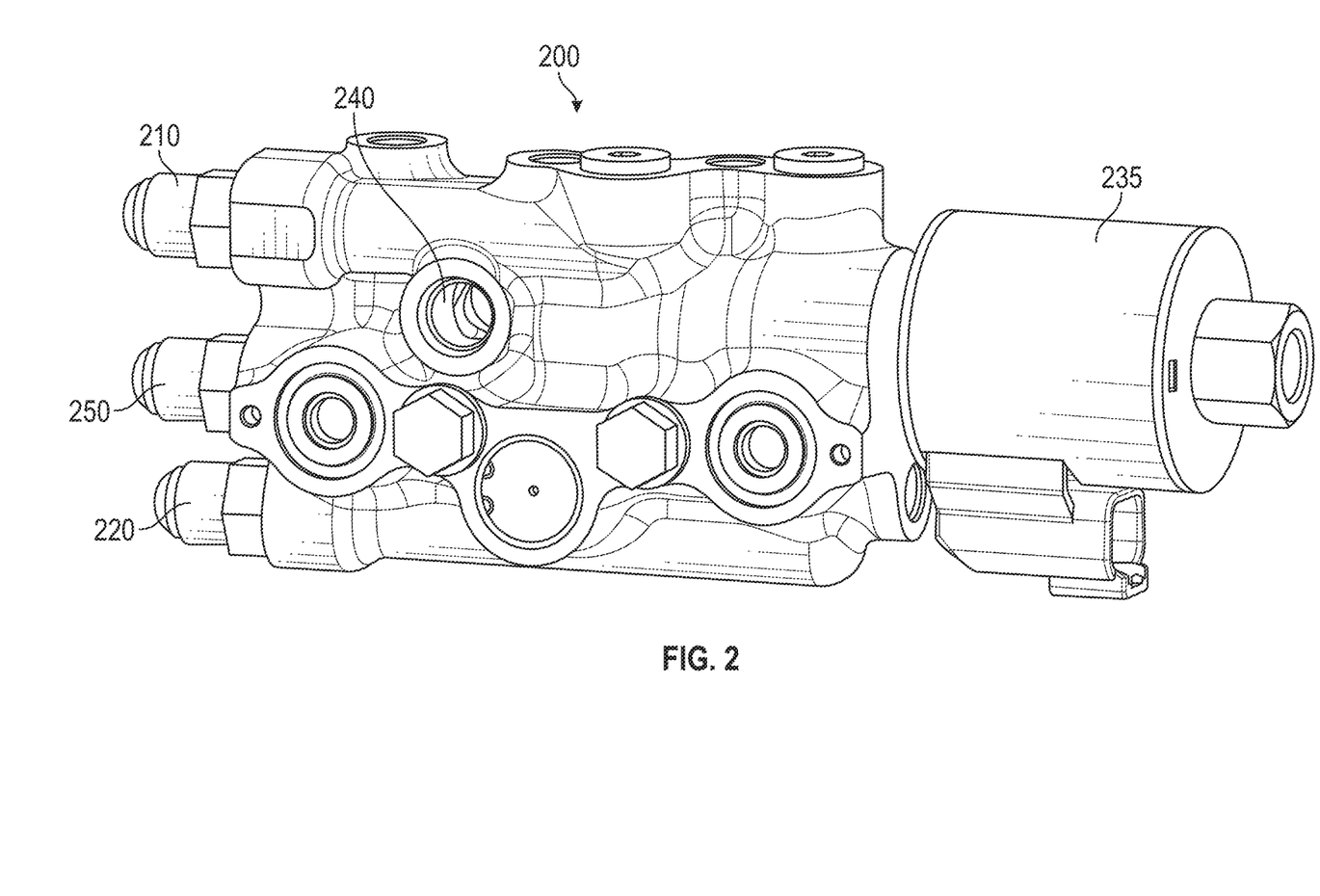
FIG. 2 is a perspective view of the control valve assembly from FIG. 1.

FIG. 2 is a perspective view of the control valve assembly from FIG. 1. The control valve assembly 200 can include a control valve 235 and a casing 205. The casing 205 can include several inlets and outlets, and form several internal passages. In an embodiment, the casing 205 includes a hydraulic fluid supply inlet 210, a hydraulic fluid drain outlet 220, a turbine open outlet 240, and a turbine closed outlet 250. In an embodiment the hydraulic fluid supply inlet 210, the hydraulic fluid drain outlet 220, and the turbine closed outlet 250 are located opposite from the control valve 235.

The hydraulic fluid supply inlet 210 can be in fluid communication with the hydraulic fluid reservoir 190 (shown on FIG. 1). The hydraulic fluid drain outlet 220 can be in fluid communication with the hydraulic fluid reservoir 190. The turbine actuator 155 (shown on FIG. 1) can be in fluid communication with the turbine open outlet 240.

Figure 3:
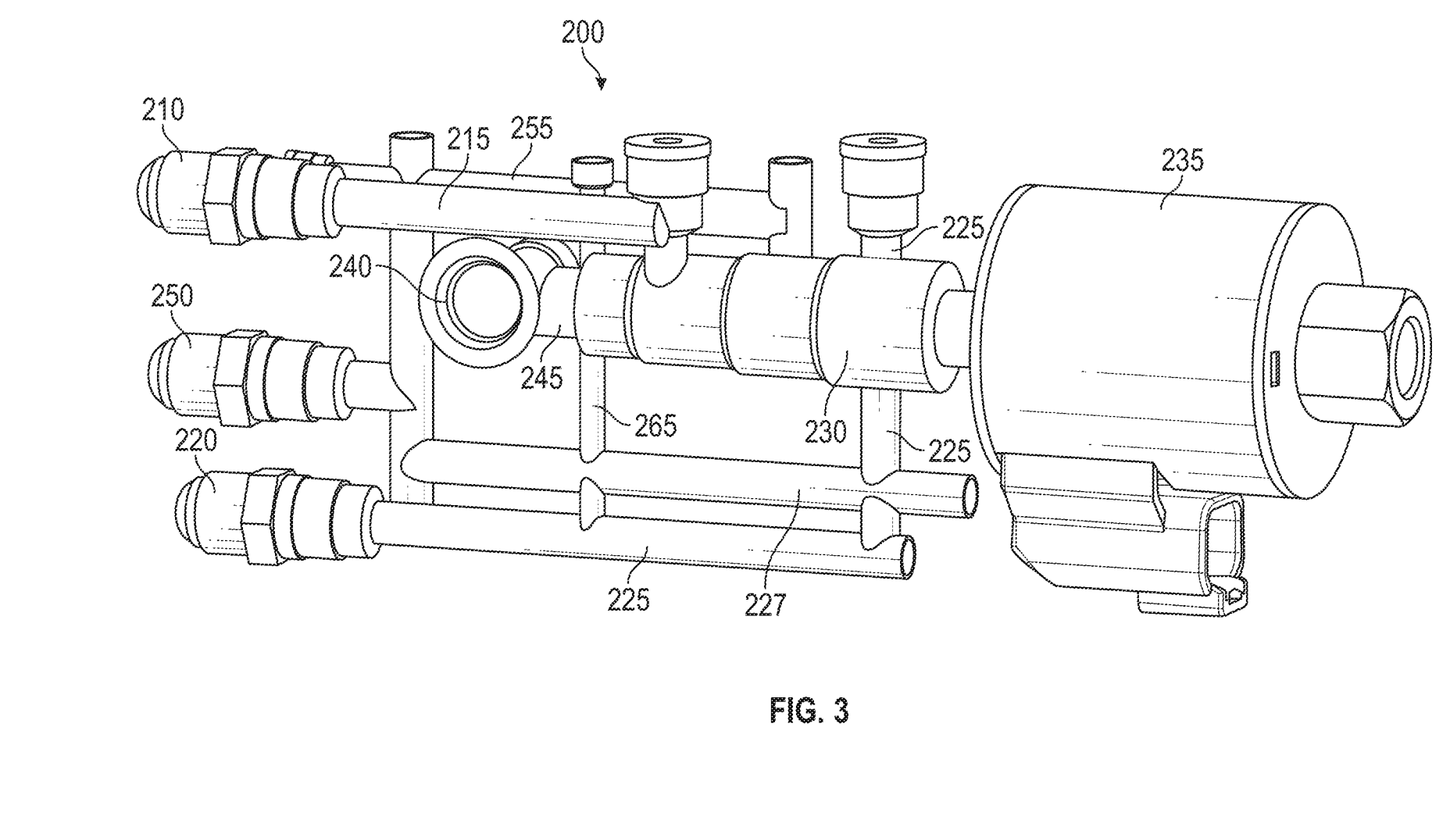
FIG. 3 is the perspective view of the control valve assembly from FIG. 2 with the casing removed.

FIG. 3 is the perspective view of the control valve assembly from FIG. 2 with the casing removed. The control valve assembly 200 can include a hydraulic fluid supply inlet passage 215, a control valve passage 230, a turbine closed passage 255, a first hydraulic fluid drain passage 225, a second hydraulic fluid drain passage 227, a turbine open passage 245, and a bypass passage 265

The hydraulic fluid supply inlet passage 215 can be in fluid communication with the hydraulic fluid supply inlet 210. In an embodiment the hydraulic fluid supply inlet passage 215 extends from the hydraulic fluid supply inlet 210 to the control valve passage 230. In an embodiment the hydraulic fluid supply inlet passage 215 extends from the hydraulic fluid supply inlet 210 towards the control valve 235 and is approximately parallel with the control valve passage 230.

The control valve passage 230 can be in fluid communication with the hydraulic fluid supply inlet passage 215. In an embodiment, the control valve passage 230 can extend from adjacent the control valve 235. The control valve passage 230 can have a stepped cylinder shape that is made up of cylinders decreasing in size as they are positioned further from the control valve 235.

The turbine open passage 245 can be in fluid communication with the control valve passage 230. In an embodiment the turbine open passage 245 extends from the control valve passage 230 to the turbine open outlet 240. In an embodiment the turbine open passage extends from the control valve passage 230 and away from the control valve 235.

The bypass passage 265 can be in fluid communication with the turbine open passage 245. In an embodiment, the bypass passage 265 extends from the turbine open passage 245 to the second hydraulic fluid drain passage 227 (bypass valve not shown in FIG. 3 for clarity).

The turbine closed passage 255 can be in fluid communication with the control valve passage 230. In an embodiment, the turbine closed passage 255 extends from the control valve passage 230 to the turbine closed outlet 260. In an embodiment, a portion of the turbine closed passage 255 extends from the control valve passage 230 and away from the control valve 235.

The first hydraulic fluid drain passage 225 can be fluid communication with the control valve passage 230. In an embodiment, the first hydraulic fluid drain passage 225 extends from the control valve passage 230 to the hydraulic fluid drain outlet 220. In an embodiment, a portion of the first hydraulic fluid drain passage 225 extends from the control valve passage 230 and away from the control valve 235.

The second hydraulic fluid drain passage 227 can be in fluid communication with the bypass passage 265 and can be in fluid communication with the turbine closed passage 255. In an embodiment, the second hydraulic fluid drain passage 227 extends from the turbine closed passage 255 to the first hydraulic fluid drain passage 225. In an embodiment, the second hydraulic fluid drain passage 227 extends from the turbine closed passage 255 towards the control valve 235.

Figure 4:
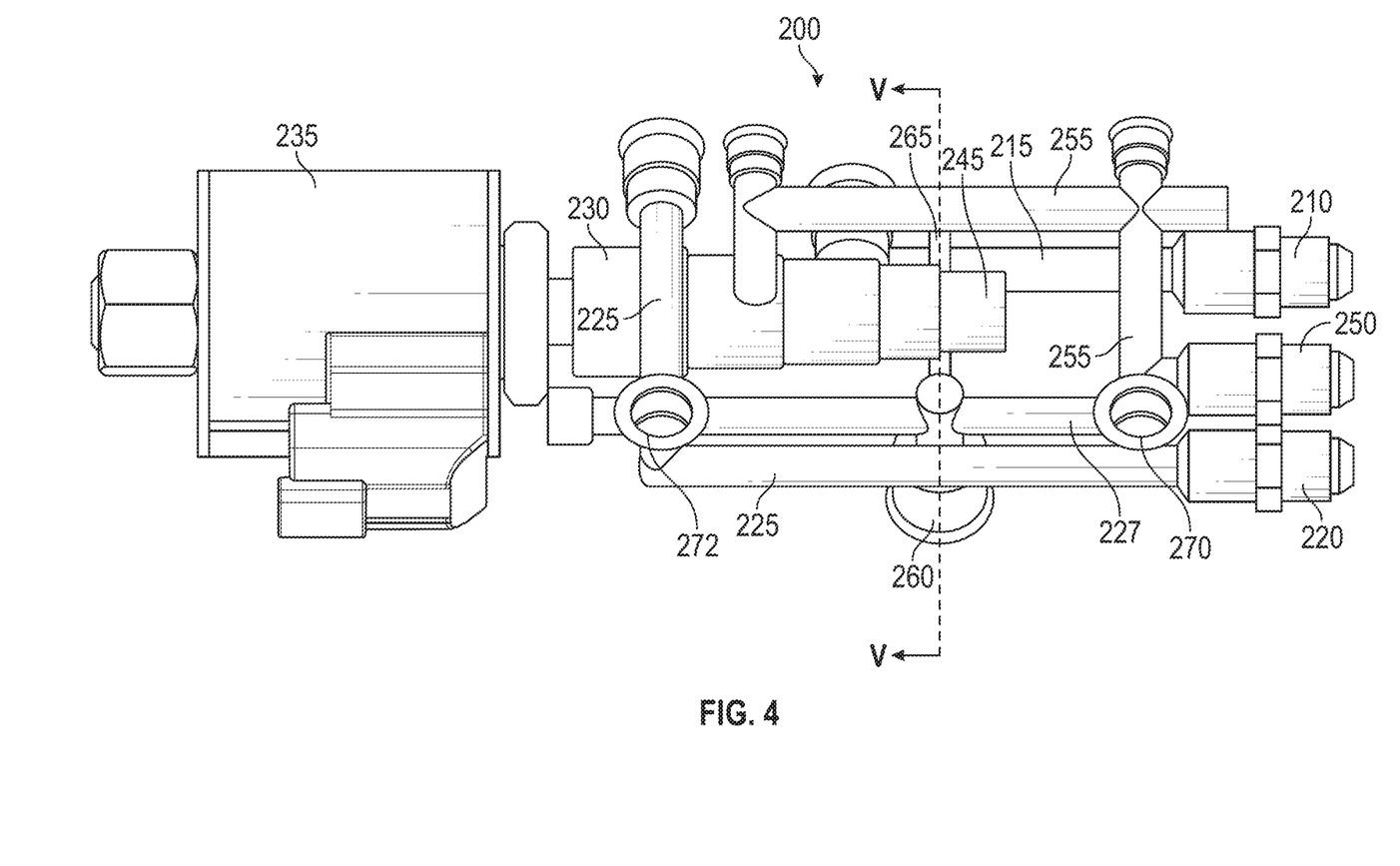
FIG. 4 is a perspective view of an opposite side of the control valve assembly with the casing removed from FIG. 3.

FIG. 4 is a perspective view of an opposite side of the control valve assembly with the casing removed from FIG. 3. The control valve assembly can include a compressor closed inlet 270, a compressor closed outlet 272, and a bypass valve 260. The compressor closed inlet 270 can be in fluid communication with the turbine closed passage 255. In an embodiment, the compressor closed inlet 270 can be positioned proximate to the intersection between the second hydraulic fluid drain passage 227 and the turbine closed passage 255. The compressor closed outlet 272 can be in fluid communication with the first hydraulic fluid drain line 225. In an embodiment the compressor closed outlet 272 can be positioned proximate to the intersection between the first hydraulic fluid drain passage 225 and the second hydraulic fluid drain passage 227. The bypass valve 260 can positioned between the bypass passage 265 and the second hydraulic fluid drain passage 227. In an embodiment the bypass valve is a spool valve.

Figure 5:
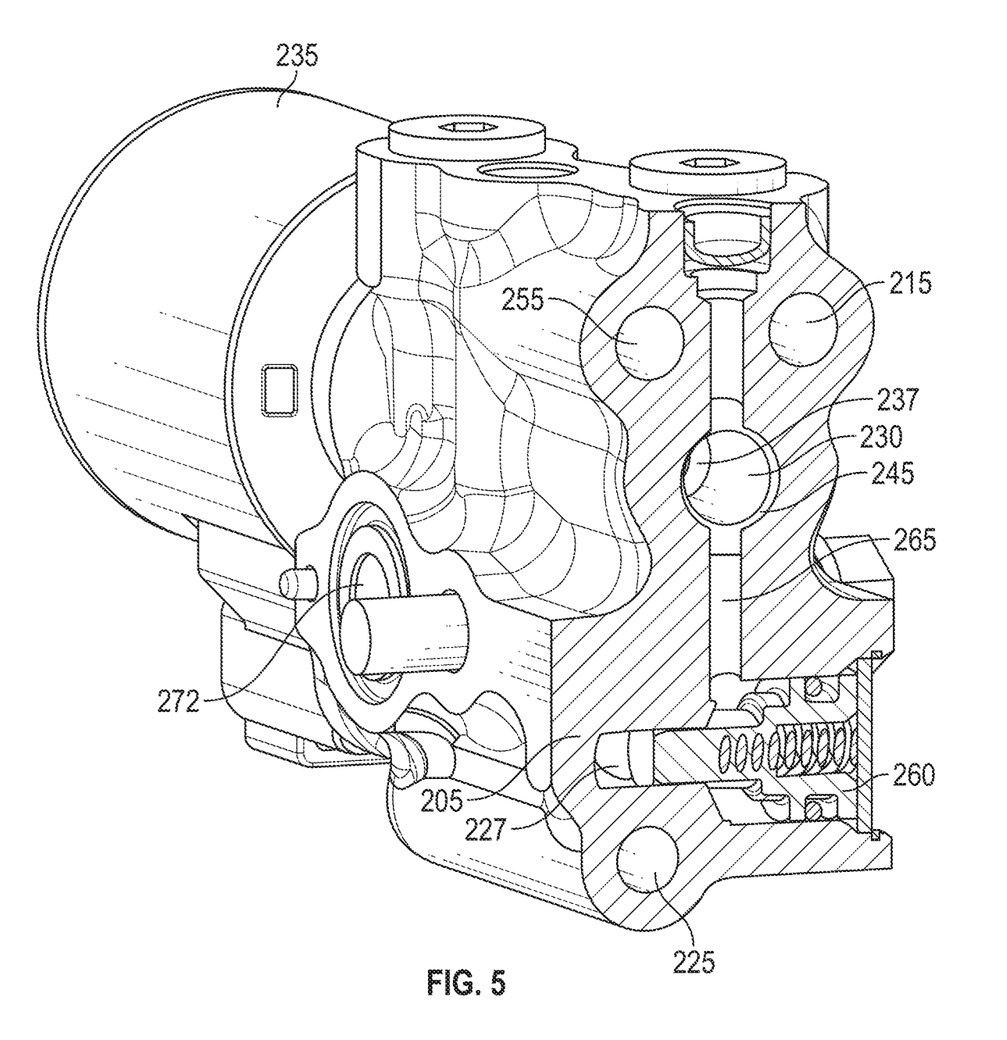
FIG. 5 is a cross-section taken through line V-V on FIG. 4 of the control valve assembly with the casing shown.

FIG. 5 is a cross-section taken through line V-V on FIG. 4 of the control valve assembly with the casing shown. The control valve 235 can comprise a piston valve and can include a control valve piston 237 that can be positioned within the control valve passage 230. The control valve piston 237 can be shaped as a hollow cylinder such as a tube and can have an opening (not shown). In an embodiment the hydraulic fluid supply inlet passage 215, the control valve passage 230, the turbine closed passage 255, the first hydraulic fluid drain passage 225, the second hydraulic fluid drain passage 227, the turbine open passage 245, and the bypass passage 265, are formed by boring into the casing 205 (shown on FIG. 2) and removing a cylindrical shape of material from the casing 205. In an embodiment the casing 205 is made of an existing control valve system and bores are added to create the second hydraulic fluid drain passage 227, the bypass passage 265, and space for the bypass valve 260.

INDUSTRIAL APPLICABILITY

The present disclosure generally applies to controlling turbocharger systems 100 for an engine system 5. The described embodiments are not limited to use in conjunction with a particular type of engine system 5, but rather may be applied to stationary or motive engine systems 5, or any variant thereof. Engine system 5, and thus their components, may be suited for any number of industrial applications, such as, but not limited to, various aspects of the marine industry, power generation industry, cogeneration, aerospace and transportation industry, to name a few examples.

Turbocharger systems 100 can provide advantageous effects for an engine system 5 by increasing the amount of air 10 available for combustion. An engine system 5 can be a staged sequential parallel turbocharger system that requires engine turbocharger systems 100 to be activated and deactivated to match engine transient or steady state operating requirements. Valves 160, 180 can be controlled by actuators 155, 175 that often require a control valve, sometimes referred to as a hydraulic circuit, to engage them. The design constraints of the hydraulic circuit may inhibit timely actuation of the valves 160, 180 and limit engine operating range.

The control valve assembly 200, includes a hydraulic powered bypass valve 260 that, when energized, can reduce flow restriction of the hydraulic fluid, and can increase the speed of actuation of valves 160, 180 for the turbocharger system 100. In other words, the bypass valve 260 can be configured to be moved/opened based on a pressure of the hydraulic fluid within the bypass passage 265 and allow the second hydraulic fluid drain passage 227 to be in fluid communication with the turbine closed passage 255.

In an embodiment, the pump 195 pumps hydraulic fluid, such as oil, from the hydraulic fluid reservoir, such as a crankcase. The control valve assembly 200 receives pressurized from a hydraulic fluid reservoir 190 through a hydraulic fluid supply inlet 210. The hydraulic fluid can be transported from the hydraulic fluid supply inlet 210 to the control valve passage 230 via the hydraulic fluid supply inlet passage 215. A control valve 235 can be controlled electrically by the ECM 80 and to change positions. The control valve 235 can be configured to increase opening speed of the turbine valve 160 by directing a portion of the hydraulic fluid from the turbine closed passage 255 through the second hydraulic fluid drain passage 227. The control valve 235 can be partially positioned within the control valve passage 230 and can be configured to be moved to direct hydraulic fluid out of the control valve passage 230 in different directions, such as the turbine open passage 245 and turbine closed passage 255.

The control valve 235 can include a control valve piston 237 shaped to be positioned within the control valve passage 230. The control valve 235 can be operable to move the control valve piston 237 along the control valve passage 230 based on the turbo valve commands sent from the engine control module 80 (Shown on FIG. 1) to switch the flow path of the hydraulic fluid between the turbine open passage 245 and the turbine closed passage 255 supplied by the control valve passage 230. In other words, the control valve 235 can be operable to receive the turbo valve commands from the engine control module 80 and change positions in response to the turbo valve commands to direct a flow of the hydraulic fluid from the control valve passage 230 and into the turbine open passage 245, and the control valve 235 can be operable to receive the turbo valve commands from the engine control module 80 and change positions in response to the turbo valve commands to direct a flow of the hydraulic fluid from the control valve passage 230 and into the turbine closed passage 255.

If the turbocharger system 100 is disengaged, the control valve piston 237 can be positioned such that hydraulic fluid is directed into the turbine closed passage 255 and not the turbine open passage 245. If the turbocharger system 100 is engaged, the control valve piston 237 can be positioned such that hydraulic fluid is directed into the turbine open passage 245 and not the turbine closed passage 255.

During disengagement of the turbocharger system 100, the hydraulic fluid can enter into the turbine closed passage 255 and the first hydraulic fluid drain passage 225 from the control valve passage 230. The first hydraulic fluid drain passage 225 can direct the hydraulic fluid from the control valve passage 230 directly to the hydraulic fluid drain outlet 220 and back into the hydraulic fluid reservoir 190.

A compressor closed inlet 270 and a turbine closed outlet 250 can be in fluid communication with the turbine closed passage 255. The hydraulic fluid can enter into the turbine closed outlet 250 and proceed to the turbine actuator 155. In an embodiment, the compressor actuator 175 can be configured to close the compressor valve 180 by receiving hydraulic fluid from the control valve assembly 200. The hydraulic fluid can control/move the turbine actuator 155, in which the turbine actuator closes the turbine valve 160 and disengages the turbocharger system 100.

From the compressor closed inlet 270 the hydraulic fluid can enter the compressor closed inlet 270 and proceed to the compressor actuator 175. The hydraulic fluid can control/move the compressor actuator 175, in which the compressor actuator 175 closes the compressor valve 180. The hydraulic fluid can be transported from the compressor actuator 175 through the compressor closed outlet 272. The hydraulic fluid can be transported from the compressor closed outlet 272 into the first hydraulic fluid drain passage 225. From the first hydraulic fluid drain passage 225 the hydraulic fluid can be transported through the hydraulic fluid drain outlet 220 and back to the hydraulic fluid reservoir 190.

During engagement of the turbocharger system 100, the hydraulic fluid enters into the turbine open passage 245 from the control valve passage 230. A turbine open outlet 240 and a bypass passage 265 can be in fluid communication with the turbine open passage 245. The hydraulic fluid can enter into the turbine open outlet 240 and proceed to the turbine actuator 155. In an embodiment, the turbine actuator 155 is in fluid communication with the control valve assembly 200 and can be configured to open and close the turbine valve 160 based on where the turbine actuator 155 receives pressurized hydraulic fluid from the control valve assembly 200. For example, two different locations at the turbine actuator 155, one for opening the turbine valve 160 and one for closing the turbine valve 160. The hydraulic fluid can control/move the turbine actuator 155, in which the turbine actuator 155 opens the turbine valve 160 and engages the turbocharger system 100.

During the transition from the turbine actuator 155 being in a closed position to an open position, hydraulic fluid can be pushed out of the turbine actuator 155 and flow back through the control valve assembly 200 to reach the hydraulic fluid reservoir 190. In an embodiment the hydraulic fluid flows from the turbine actuator 155, through the turbine closed outlet 250, into the turbine closed passage 255, into the control valve passage 230, into the first hydraulic fluid drain passage 225, out of the hydraulic fluid drain outlet 220 and into the hydraulic fluid reservoir 190.

The bypass passage 265 can be configured to allow the second hydraulic fluid drain passage 227 to be in fluid communication with the turbine closed passage 255 based on the pressure of the hydraulic fluid in the turbine open passage 245. In an embodiment, the bypass valve 260 can be configured to provide fluid communication between the bypass passage 265 and the second hydraulic fluid drain passage 227 in response to the pressure of the hydraulic fluid reaching a predetermined level within the bypass passage 265. In an embodiment, a portion of the bypass valve 260 can be opened or move incrementally with respect to the magnitude of pressure provided by the hydraulic fluid. In an embodiment, a portion of the bypass valve 260 can be positioned or moved between an open and closed position with respect to a pressure threshold related to the pressure provided by the hydraulic fluid.

During engagement of a turbocharger system 100, hydraulic fluid can enter the bypass passage 265, and the hydraulic fluid can actuate a portion of the bypass valve 260 from obstructing a portion of the second hydraulic fluid drain passage 227 in response to a pressure level of the hydraulic fluid. Moving the bypass valve 260, can open a second path and allow the hydraulic fluid left over in the compressor actuator 175 from the previous disengagement event to follow the path, leading to a faster turbocharger system 100 engagement time in comparison to a control valve without a bypass passage 265, bypass valve 260, and second hydraulic fluid drain passage 227. In an embodiment, moving the bypass valve 260 can allow the hydraulic fluid located within the compressor actuator 175 left over from the last disengagement event to flow into the turbine closed passage 255, into the second hydraulic fluid drain passage 227, into the first hydraulic fluid drain passage 225, and drain out of the control valve assembly 200 through the hydraulic fluid drain outlet 220 and back into the hydraulic fluid reservoir 190. Additionally, the hydraulic fluid passing through the bypass passage 265 can continue into the second hydraulic fluid drain passage 227.

Along a second path, the hydraulic fluid flows from the compressor actuator 175, through the compressor closed inlet 270, into the turbine closed passage 255, into the control valve passage 230, into the first hydraulic fluid drain passage 225, out of the hydraulic fluid drain outlet 220, and into the hydraulic fluid reservoir 190.

The second hydraulic fluid drain passage 227 can be used to provide an additional passage, effectively increasing the total size of the passages, allowing the hydraulic fluid to move out of the compressor actuator 175 and into the first hydraulic fluid drain passage 225 to be drained out from the control valve assembly 200 during an engagement of a turbocharger system 100.

When the turbine actuator 155 and turbine valve 160 are in the open position, the hydraulic fluid can flow from the control valve passage 230, into the hollow portion of the control valve piston 237, into the first hydraulic fluid drain passage 225, through the hydraulic fluid drain outlet 220, and into the hydraulic fluid reservoir 190.

The preceding detailed description is merely exemplary in nature and is not intended to limit the invention or the application and uses of the invention. The described embodiments are not limited to use in conjunction with a particular type of engine system 5 or process. Hence, although the present disclosure, for convenience of explanation, depicts and describes particular embodiments of the engine system 5, it will be appreciated that the engine system 5 in accordance with this disclosure can be implemented in various other configurations. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A control valve assembly for an engine system having a turbine with a turbine valve, an engine control module, a hydraulic fluid reservoir, and hydraulic fluid, the engine control module operable to send turbo valve commands, the control valve assembly comprising:
    a hydraulic fluid supply inlet;
    a hydraulic fluid supply inlet passage in fluid communication with the hydraulic fluid supply inlet;
    a control valve passage in fluid communication with the hydraulic fluid supply inlet passage;
    a control valve partially positioned within the control valve passage;
    a turbine closed passage in fluid communication with the control valve passage;
    a compressor closed inlet in fluid communication with the turbine closed passage;
    a compressor closed outlet;
    a first hydraulic fluid drain passage in fluid communication with the compressor closed outlet;
    a hydraulic fluid drain outlet in fluid communication with the first hydraulic fluid drain passage;
    a second hydraulic fluid drain passage extending from the first hydraulic fluid drain passage to the turbine closed passage;
    a turbine open passage in fluid communication with the control valve passage;
    a bypass passage in fluid communication with the turbine open passage, the bypass passage extending from the turbine open passage towards the second hydraulic fluid drain passage; and
    a bypass valve located between the bypass passage and the second hydraulic fluid drain passage.

2. The control valve assembly of claim 1, wherein the control valve comprises an electro hydraulic control valve and the bypass valve comprises a spool valve.

3. The control valve assembly of claim 2, wherein the control valve comprises a control valve piston shaped to be positioned within the control valve passage, the control valve operable to move the control valve piston along the control valve passage based on the turbo valve commands sent from the engine control module to switch a flow path of the hydraulic fluid between the turbine open passage and the turbine closed passage supplied by the control valve passage.

4. The control valve assembly of claim 2, wherein the control valve is configured to increase opening speed of the turbine valve by directing a portion of the hydraulic fluid from the turbine closed passage through the second hydraulic fluid drain passage.

5. The control valve assembly of claim 1, wherein a portion of the bypass valve is configured to actuate in response to a pressure level of the hydraulic fluid within the bypass passage and allow the second hydraulic fluid drain passage to be in fluid communication with the turbine closed passage.

6. The control valve assembly of claim 1, wherein the bypass passage is configured to allow the second hydraulic fluid drain passage to be in fluid communication with the turbine closed passage based on a pressure of the hydraulic fluid in the turbine open passage.

7. A turbocharger system for an engine system having an engine control module and a hydraulic fluid reservoir containing hydraulic fluid, the turbocharger system comprising:
    a control valve assembly having
        a hydraulic fluid supply inlet configured to receive the hydraulic fluid from the hydraulic fluid reservoir;
        a hydraulic fluid supply inlet passage in fluid communication with the hydraulic fluid supply inlet;
        a control valve passage in fluid communication with the hydraulic fluid supply inlet passage;
        a control valve partially positioned within the control valve passage, configured to move to direct hydraulic fluid out of the control valve passage in different directions;
        a turbine closed passage in fluid communication with the control valve passage;
        a compressor closed inlet in fluid communication with the turbine closed passage;
        a compressor closed outlet;
        a first hydraulic fluid drain passage in fluid communication with the compressor closed outlet;
        a hydraulic fluid drain outlet in fluid communication with the first hydraulic fluid drain passage;
        a second hydraulic fluid drain passage in fluid communication with the first hydraulic fluid drain passage, the second hydraulic fluid drain passage extending from the first hydraulic fluid drain passage to the turbine closed passage;
        a turbine open passage in fluid communication with the control valve passage;

a bypass passage in fluid communication with the turbine open passage, the bypass passage extending from the turbine open passage towards the second hydraulic fluid drain passage; and a bypass valve configured to provide fluid communication between the bypass passage and the second hydraulic fluid drain passage in response to a pressure of the hydraulic fluid reaching a predetermined level.

8. The turbocharger system of claim 7, wherein the turbocharger system further comprises a turbine having a turbine valve and a turbine actuator, the turbine actuator in fluid communication with the control valve assembly and configured to open and close the turbine valve based on where the turbine actuator receives hydraulic fluid from the control valve assembly.

9. The turbocharger system of claim 8, wherein the turbocharger system further comprises a compressor having a compressor valve and a compressor actuator, the compressor actuator in fluid communication with the control valve assembly and configured to close the compressor valve by receiving hydraulic fluid from the control valve assembly.

10. The turbocharger system of claim 7, wherein the bypass valve is configured to be moved based on a pressure of the hydraulic fluid within the bypass passage and allow the second hydraulic fluid drain passage to be in fluid communication with the turbine closed passage.

11. The turbocharger system of claim 7, wherein the control valve is operable to receive the turbo valve commands from the engine control module and change positions in response to a first turbo valve command to direct a flow of the hydraulic fluid from the control valve passage into the turbine open passage, and the control valve is operable to receive a second turbo valve command from the engine control module and change positions in response to the turbo valve commands to direct a flow of the hydraulic fluid from the control valve passage into the turbine closed passage.

12. The turbocharger system of claim 8, wherein the control valve is configured to increase opening speed of the turbine valve by directing a portion of the hydraulic fluid from the turbine closed passage through the second hydraulic fluid drain passage.

13. The turbocharger system of claim 9, wherein the compressor actuator is a one way actuator with an overcenter spring and the compressor valve is configured to opened based on vacuum pressure.

14. The turbocharger system of claim 8, wherein the turbine valve is a butterfly valve and the compressor valve is a flapper valve.

15. The turbocharger system of claim 7, wherein the control valve comprises an electro hydraulic control valve and the bypass valve comprises a spool valve.

16. A control valve assembly for an engine system having turbine with a turbine valve, an engine control module, a hydraulic fluid reservoir, and hydraulic fluid, the engine control module operable to send turbo valve commands, the control valve assembly comprising:

a hydraulic fluid supply inlet;

a hydraulic fluid supply inlet passage in fluid communication with the hydraulic fluid supply inlet;

a control valve passage in fluid communication with the hydraulic fluid supply inlet passage;

a turbine closed passage in fluid communication with the control valve passage;

a turbine open passage in fluid communication with the control valve passage;

a control valve operable to receive the turbo valve commands from the engine control module and change positions in response to a first turbo valve command to direct a flow of the hydraulic fluid from the control valve passage into the turbine open passage, the control valve operable to receive a second turbo valve command from the engine control module and change positions in response to the turbo valve commands to direct a flow of the hydraulic fluid from the control valve passage into the turbine closed passage;

a compressor closed inlet in fluid communication with the turbine closed passage;

a compressor closed outlet;

a first hydraulic fluid drain passage in fluid communication with the compressor closed outlet;

a hydraulic fluid drain outlet in fluid communication with the first hydraulic fluid drain passage;

a second hydraulic fluid drain passage in fluid communication with the first hydraulic fluid drain passage, the second hydraulic fluid drain passage extending from the first hydraulic fluid drain passage to the turbine closed passage;

a bypass passage in fluid communication with the turbine open passage, the bypass passage extending from the turbine open passage towards the second hydraulic fluid drain passage; and a bypass valve configured to open based on a pressure of the hydraulic fluid within the bypass passage and allow the second hydraulic fluid drain passage to be in fluid communication with the turbine closed passage.

17. The control valve assembly of claim 16, wherein the control valve comprises an electro hydraulic control valve and the bypass valve comprises a spool valve.

18. The control valve assembly of claim 16, wherein the control valve is configured to increase opening speed of the turbine valve by directing a portion of the hydraulic fluid from the turbine closed passage through the second hydraulic fluid drain passage.

* * * * *